United States Patent [19]
Minoura

[11] 3,973,831
[45] Aug. 10, 1976

[54] SYMMETRICAL LENS SYSTEM AFFORDING VARIABLE MAGNIFICATION

[75] Inventor: Kazuo Minoura, Yokohama, Japan

[73] Assignee: Canon Kabushiki Kaisha, Tokyo, Japan

[22] Filed: Dec. 20, 1974

[21] Appl. No.: 534,887

Related U.S. Application Data

[63] Continuation of Ser. No. 349,542, April, 1973, abandoned.

[30] Foreign Application Priority Data

Apr. 17, 1972 Japan.................................. 47-37668

[52] U.S. Cl.................................. 350/184; 350/214
[51] Int. Cl.² ...................... G02B 15/00; G02B 9/00
[58] Field of Search ........... 350/184, 214, 220, 226, 350/186

[56] References Cited
UNITED STATES PATENTS

3,687,522  8/1972  Lynch et al. ........................ 350/184
3,728,010  4/1973  Mikami .............................. 350/184

*Primary Examiner*—John K. Corbin
*Assistant Examiner*—Conrad Clark
*Attorney, Agent, or Firm*—Toren, McGeady and Stanger

[57] ABSTRACT

A varifocal lens system comprising a pair of movable lens groups located outwardly which are symmetrical with respect to the diaphragm and a pair of stationary lens groups located inwardly from said groups which are also symmetrical with respect to the diaphragm, said movable lens group being moved axially in the symmetrically spaced relationship with respect to the diaphragm and simultaneously the entire lens system being displaced as a unit by an axial distance depending on the amount of displacement of the movable lens group to satisfy the correct image-forming conditions throughout the entire magnification range while maintaining an object plane and an image plane spaced at a fixed axial distance.

5 Claims, 3 Drawing Figures

SYMMETRICAL LENS SYSTEM AFFORDING VARIABLE MAGNIFICATION

This is a continuation of application Ser. No. 349,542 filed Apr. 9, 1973 now abandoned.

In general, the copy work which is seen in office copying machines, lithographic master reproducing machines and the like is performed by using lenses having fixed focal lengths. When changes in magnification are necessary, it is usual that the lens assembly is moved along its optical axis and at the same time, the relative axial distance between a plane of document to be reproduced and a photographic film plane is varied. According to this invention, however, the document plane and its image plane are always maintained stationary at fixed positions between which the lens system to which this invention relates is moved along its optical axis to effect a variation in magnification. Therefore, when the lens system of this invention is employed in process cameras of large scale and the like, it will increase its utility of making convenient the copy work with change in magnification inasmuch as the supports carrying original copies and the film planes may be fixed.

The lens system of this invention is characterized in that a pair of movable lens groups which are symmetrical with respect to the diaphragm are positioned outwardly to the diaphragm and optically aligned on the optical axis with a pair of stationary lens groups inwardly positioned therefrom which are also symmetrical with respect to the diaphragm, the movable lens groups being moved axially in the symmetrically spaced relationship with respect to the diaphragm to effect a magnification variation, and at the same time the entire lens system being displaced along its optical axis according to a law related to the movement of the movable lens groups to satisfy the image-forming conditions throughout the entire magnification range while keeping the axial distance between the object plane and image plane constant.

This invention will be now explained with reference to the drawings.

Figure 1:
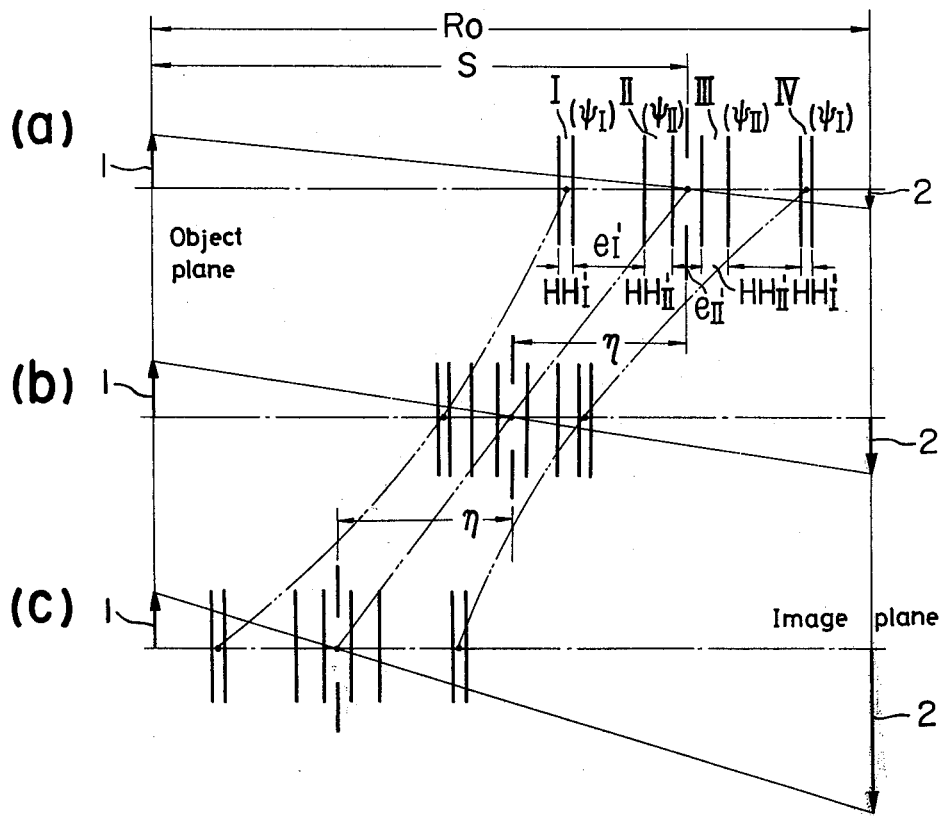
FIG. 1 is an optical diagram illustrating the principle of operation of the lens system of this invention, in which the relationship between the movement of the lens groups and the displacement of the entire lens system is shown in connection with three different magnifications.

Referring to FIG. 1, the principle of the lens system of this invention will be explained hereinbelow. Seeing that the two movable lens groups designated I, IV, which are arranged farthest from the diaphragm are symmetrical with respect to the diaphragm as well as the two stationary lens groups designated II, III, which are arranged inwardly from the movable lens groups, letting the axial distance between the principal points of the adjacent stationary lens group and movable lens group be $e_I'$, the axial distance between the principal points of the two stationary lens groups be $e_{II}'$, the overall power of each movable lens group be $\phi_I$, and the overall power of each stationary lens group be $\phi_{II}$, and putting $\phi_I + \phi_{II} = A$ (= constant) and $\phi_I \phi_{II} = B$ (= constant), we get the overall power of the entire lens system expressed by $$\Phi = e_I'^2(2\phi_I - Be_{II}') B + 2e_I'(ABe_{II}' - A\phi_I - B) + A(2 - Ae_{II}') \quad (1)$$

Letting the principal point interval of each movable lens group be $HH_I'$, and the principal point interval of each stationary lens group be $HH_{II}'$, we get the principal point interval $HH'$ of the entire lens system expressed by $$HH' = e_{II}' + 2(HH_I' + HH_{II}') \\ + 2\{e_I' 1 - \phi_{II}/(A - e_I' B)\} \\ -\{e_{II}' + 2e_I'\phi_I/(A - e_I' B)\} (A - e_I' B)/\Phi] \quad (2)$$

As is evident from formulae (1) and (2), $\Phi$ and $HH'$ are functions of only a variable $e_I'$. Therefore, they may be written $\Phi(e_I')$ and $HH'(e_I')$. Letting the axial distance between the object plane and image plane be $R_0$, we get a magnification formula $\beta$ of this optical system expressed by $$\beta = \frac{\{R_0 - HH'(e_I')\} \Phi(e_I') - 2}{2} \\ \pm \frac{\sqrt{[\{R_0 - HH'(e_I')\} \Phi(e_I') - 2]^2 - 4}}{2} \quad (3)$$

As is evident from formula (3), the magnification $\beta$ is also a function of only the variable $e_I'$. It may be written $\beta(e_I')$, and the axial distance $S$ from the diaphragm of the lens system to the object plane may be expressed by $$S = \{1 + 1/\beta(e_I')\}/\Phi(e_I') + HH'(e_I')/2 \quad (4)$$

$S$ is also a function of only the variable $e_I'$, and it may be written $S(e_I')$. Let us suppose the movable lens groups are moved between $e_i'$ and $e_j'$. If the overall powers of the entire lens system corresponding to $e_i$ and $e_j$ are written $\Phi(e_i')$ and $\Phi(e_j')$, the principal point intervals $HH'(e_i')$, $HH'(e_j')$, the magnifications $\beta(e_i')$, $\beta(e_j')$, the axial distances from the diaphragm of the lens system to the object plane $S(e_i')$ and $S(e_j')$ respectively, the amount of displacement designated $\eta_{ij}$ of the entire lens system corresponding to $e_i'$ and $e_j'$ may be expressed by $$\eta_{ij} = S(e_i') - S(e_j') \\ = \{1 + 1/\beta(e_i')\}/\Phi(e_i') - 1 + 1/\beta(e_j') / \Phi(e_j') \\ + \{HH'(e_i') - HH'(e_j') ) - HH'(e_j')\}/2 \quad (5)$$

As is evident from this formula, the displacement of the entire lens system is also a function of only the variable $e_I'$. Therefore, using the axial distance designated $e_I'$ between the principal points of the stationary and movable lens groups as a parameter, we can define the relations among the overall power of the entire lens system, the principal point interval, the magnification, the lens group positions and the amount of displacement of the entire lens system.

As has been stated above, according to this invention, comprised in the lens system are a pair of stationary lens groups arranged near to the diaphragm which are symmetrical with respect to the diaphragm, and a pair of movable lens groups arranged outwardly at a variable axial airspace therefrom which are also symmetrical with respect to the diaphragm so that the overall power of the entire lens system can be varied by varying the axial distance between the stationary and movable lens groups to vary the magnification of image while satisfying always the correct image-forming conditions, because a subordinate relationship is established between the amount of movement of the movable lens group and the amount of displacement of the entire lens system, although the axial distance between the object plane and image plane are maintained constant throughout the entire magnification range. FIGS. 1(a)(b)(c) show the subordinate relationship between the movement of the movable lens groups and the displacement of the entire lens system in connection with different magnifications, 1(a) showing the case of magnification $1/\beta$, 1(b) showing the case of unit magnification, 1(c) showing the case of magnification $\beta$, numeral 1 denoting an object, and numeral 2 denoting images of the object.

Further, the above-mentioned explanation has been given to a case in which the entire lens system is divided into four lens groups of which a pair of stationary lens groups are positioned near to the diaphragm and the other two movable lens groups are arranged outwardly therefrom, but we may develop the above-mentioned lens system in such a manner that optically aligned along the optical axis with the lens groups I, II, III and IV are an additional pair of stationary lens groups which are symmetrical to the diaphragm and which are positioned outside the movable lens groups. In this case, the mechanism for varying the magnification is substantially the same as the above except that the formulae (1) and (2) for the overall power and principal point interval of the entire lens system should be slightly modified. Such a modification will decrease the amount of movement of the movable lens groups and it brings forth an advantage in correcting aberrations.

Figure 2:
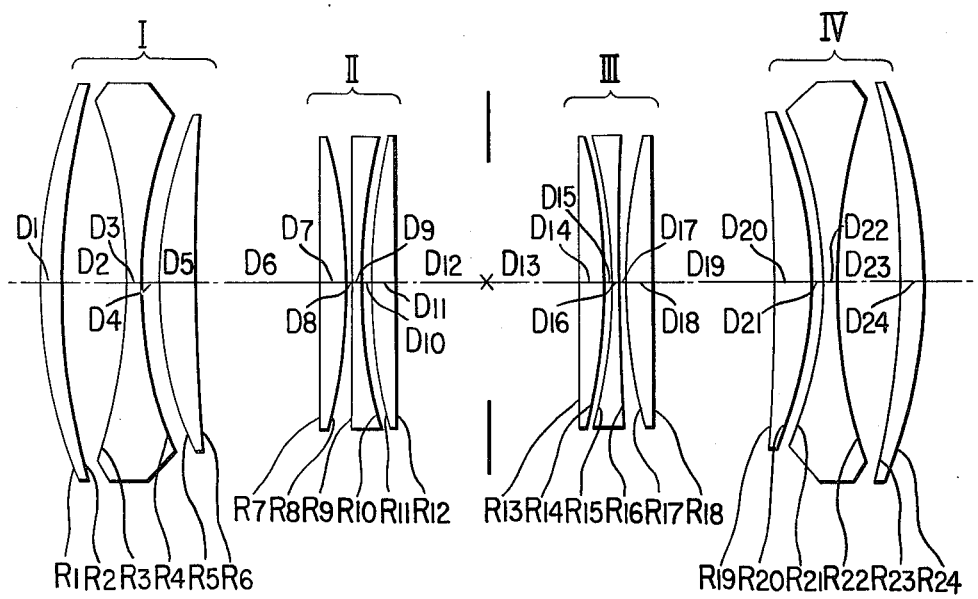
FIG. 2 is a lens block diagram of one embodiment of this invention.

Constructional data with respect to one embodiment of the lens system of this invention are given herebelow. As shown in FIG. 2, four lens groups including twelve lens elements constitute the entire lens system in which I and IV denote symmetrical movable lens groups, and II and III denote symmetrical stationary lens groups.

R: the radii of curvature of the successive lens refracting surfaces

D: the axial thicknesses or axial airspaces of the successive lens elements

N: the refractive indices (for $d$ line) of the successive lens element glasses

V: the Abbe numbers of the successive lens element glasses.

| | | | |
|---|---|---|---|
| Movable Lens Group | $R_1 = -R_{24} = 43.18161$<br>$D_1 = D_{24} = 1.99514$<br>$R_2 = -R_{23} = 70.30859$<br>$D_2 = D_{23} = 5.45201$<br>$R_3 = -R_{22} = -55.64474$<br>$D_3 = D_{22} = 0.946$<br>$R_4 = -R_{21} = 33.95923$<br>$D_4 = D_{21} = 1.23186$<br>$R_5 = -R_{20} = 36.53544$<br>$D_5 = D_{20} = 3.45097$<br>$R_6 = -R_{19} = 167.11292$<br>$D_6 = D_{19} =$ (variable) | $N_1 = N_{12} = 1.62360$<br><br><br>$N_2 = N_{11} = 1.55957$<br><br><br>$N_3 = N_{10} = 1.53269$ | $V_1 = V_{12} = 46.9$<br><br><br>$V_2 = V_{11} = 61.2$<br><br><br>$V_3 = V_{10} = 45.9$ |
| Stationary Lens Group | $R_7 = -R_{18} = -538.71386$<br>$D_7 = D_{18} = 2.46077$<br>$R_8 = -R_{17} = -46.78787$<br>$D_8 = D_{17} = 0.02358$<br>$R_9 = -R_{16} = -895.93699$<br>$D_9 = D_{16} = 0.72497$<br>$R_{10} = -R_{15} = 52.68860$<br>$D_{10} = D_{15} = 0.85464$<br>$R_{11} = -R_{14} = 60.71876$<br>$D_{11} = D_{14} = 1.71222$<br>$R_{12} = -R_{13} = \infty$<br>$D_{12} = D_{13} = 1.89119$ | $N_4 = N_9 = 1.69346$<br><br><br>$N_5 = N_8 = 1.6691$<br><br><br>$N_6 = N_7 = 1.66986$ | $V_4 = V_9 = 53.3$<br><br><br>$V_5 = V_8 = 33.0$<br><br><br>$V_6 = V_7 = 57.4$ |

Representative values for the variable axial airspace $f$, and the corresponding values for the equivalent focal length designated $f$ of the entire lens system, the principal point interval HH', the axial distance S from the diaphragm of the lens to the object plane and the magnification $\beta$ are given below wherein the axial distance $R_0$ between the object and image plane is 623.94.

| | | | | | |
|---|---|---|---|---|---|
| $f$ | | 16.130 | | 10.589 | 3.242 |
| $f$ | | 100.86 | | 119.31 | 153.99 |
| HH' | | 13.170 | | 10.453 | 7.9828 |
| S | 489.9 | 134.1 | 456.5 | 167.4 | 312.0 |
| $\beta$ | 0.264 | 3.792 | 0.359 | 2.782 | 1.0 |

Figure 3:
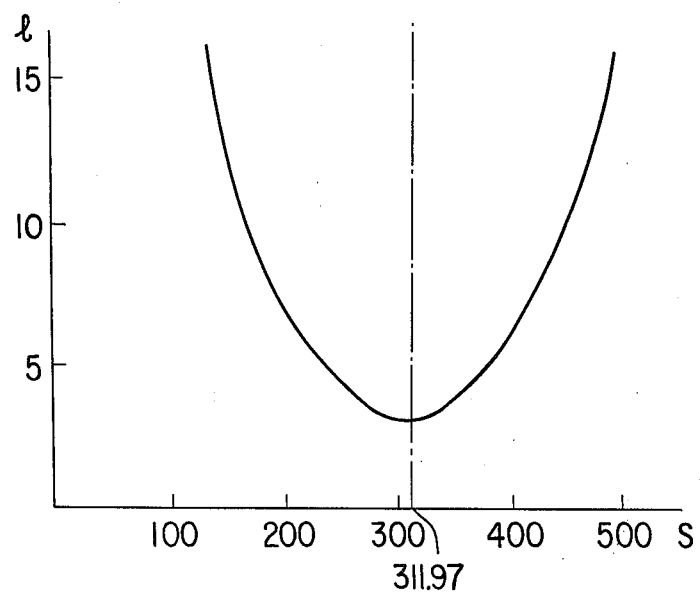
FIG. 3 is a graph for showing the variation of airspace between the movable lens group and the stationary lens group with respect to the variation of axial distance from the diaphragm to the object plane in the above-mentioned embodiment.

FIG. 3 shows the relation between the variable axial airspace between the movable lens group and the stationary lens group and the axial distance S from the diaphragm of the lens to the object plane with respect to the above-mentioned embodiment.

What is claimed is:

1. A varifocal lens system comprising a diaphragm, a pair of movable lens groups located so as to be axially symmetrical with respect to the diaphragm and a pair of stationary lens groups located between said movable lens groups and also symmetrical with respect to the diaphragm, and simultaneously the entire lens system being displaced as a unit in a subordinate relationship relative to the movement of the movable lens groups to satisfy the correct image-forming conditions throughout the entire magnification range while maintaining an object plane and an image plane stationary at a fixed axial distance and wherein said stationary lens groups are positive and said movable lens groups are negative, and the distances between the positive lens groups and the negative lens groups are varied symmetrically with respect to the diaphragm simultaneous with the movement of the entire lens system, wherein each of said lens groups have nearly equivalent absolute values of power and are composed of three lens members, said central lens member in each group being negative and said outer lens members in each group being positive.

2. A system as in claim 1, wherein said negative lens group includes a positive meniscus lens member whose convex surface faces outwardly and a biconcave lens member and a plano-convex lens member arranged in sequence from the outside towards said diaphragm, said positive lens group including one negative lens member interposed between two positive lens members.

3. A varifocal lens system of the symmetrical type for affording variable magnification between an object and a sensitive body stationary relative to each other with a predetermined distance therebetween, comprising a diaphragm, a pair of movable lens groups located to be axially symmetrical with respect to the diaphragm and a pair of stationary lens groups located between said movable lens groups and also symmetrical with respect to the diaphragm, said stationary lens groups being positive, said movable lens groups being negative, said movable lens groups being moved axially in symmetrically spaced relationship relative to the diaphragm, and simultaneously the entire system being displaced as a unit in subordinate relationship relative to the movement of the movable lens groups to satisfy the correct image-forming conditions throughout the entire magnification range and affording variable magnification by movement of the entire lens system along the optical axis between the object and a sensitive body and wherein each of said lens groups have nearly equivalent absolute values of power and are composed of three lens members, said central lens member in each group being negative and said outer lens members in each group being positive.

4. A system as in claim 3, wherein said negative lens group includes a positive meniscus lens member whose convex surface faces outwardly and biconcave lens member and a plano-convex lens member arranged in sequence from the outside towards said diaphragm, said positive lens group including one negative lens member interposed between two positive lens members.

5. A varifocal lens system comprising a diaphragm, a pair of movable lens groups located to be axially symmetrical with respect to the diaphragm and a pair of stationary lens groups located between said movable lens groups and also symmetrical with respect to the diaphragm, said movable lens groups being moved axially in symmetrically spaced relationship relative to the diaphragm, and simultaneously the entire lens system being displaced as a unit in a subordinate relationship relative to the movement of the movable lens groups to satisfy the correct image-forming conditions throughout the entire magnification range while maintaining an object plane and an image plane stationary at a fixed axial distance, and wherein said four lens groups are identified as I, II, III, and IV and each group includes three lens elements and all the resulting 12 elements constitute the entire lens system, in which I and IV denote symmetrical movable lens group, and II and III denote symmetrical stationary lens groups and in which R: the radii of curvature of the successive lens refracting surfaces
D: the axial thicknesses or axial airspaces of the successive lens elements
N: the refractive indices (for $d$ line) of the successive lens element glasses
V: the Abbe numbers of the successive lens element glasses;

| | | | |
|---|---|---|---|
| Movable Lens Group | $R_1 = -R_{24} = 43.18161$<br>$D_1 = D_{24} = 1.99514$<br>$R_2 = -R_{23} = 70.30859$<br>$D_2 = D_{23} = 5.45201$<br>$R_3 = -R_{22} = -55.64474$<br>$D_3 = D_{22} = 0.946$<br>$R_4 = -R_{21} = 33.95923$<br>$D_4 = D_{21} = 1.23186$<br>$R_5 = -R_{20} = 36.53544$<br>$D_5 = D_{20} = 3.45097$<br>$R_6 = -R_{19} = 167.11292$<br>$D_6 = D_{19} = \int$ (variable) | $N_1 = N_{12} = 1.62360$<br><br>$N_2 = N_{11} = 1.55957$<br><br>$N_3 = N_{10} = 1.53269$ | $V_1=V_{12}=46.9$<br><br>$V_2=V_{11}=61.2$<br><br>$V_3=V_{10}=45.9$ |
| Stationary Lens Group | $R_7 = -R_{18} = -538.71386$<br>$D_7 = D_{18} = 2.46077$<br>$R_8 = -R_{17} = -46.78787$<br>$D_8 = D_{17} = 0.02358$<br>$R_9 = -R_{16} = -895.93699$ | $N_4 = N_9 = 1.69346$ | $V_4=V_9=53.3$ |
| Stationary Lens Group | $D_9 = D_{16} = 0.72497$<br>$R_{10} = -R_{15} = 52.68860$<br>$D_{10} = D_{15} = 0.85464$<br>$R_{11} = -R_{14} = 60.71876$<br>$D_{11} = D_{14} = 1.71222$<br>$R_{12} = -R_{13} = \infty$<br>$D_{12} = D_{13} = 1.89119.$ | $N_5 = N_8 = 1.66691$<br><br>$N_6 = N_7 = 1.66986$ | $V_5=V_8=33.0$<br><br>$V_6=V_7=57.4$ |

* * * * *